United States Patent [19]

Allen

[11] Patent Number: 5,111,981
[45] Date of Patent: May 12, 1992

[54] GAME CALL HOLDER

[76] Inventor: Melvin L. Allen, 16 Welch Dr., Haughton, La. 71037

[21] Appl. No.: 657,175

[22] Filed: Feb. 19, 1991

[51] Int. Cl.⁵ .................................. A45F 3/01
[52] U.S. Cl. ........................... 224/202; 224/250; 224/252; 224/269; 224/901; 446/397; 446/901
[58] Field of Search ............... 224/182, 195, 202, 205, 224/250, 252, 257, 258, 269, 901; 24/3 B; 446/27, 28, 397 X, 901 X; 2/DIG. 6

[56] References Cited

U.S. PATENT DOCUMENTS

| | | | |
|---|---|---|---|
| 1,151,696 | 8/1915 | Levin | 224/264 X |
| 1,273,201 | 7/1918 | Teuber | 224/182 |
| 1,827,524 | 10/1931 | Hilburger | 224/194 X |
| 2,911,694 | 11/1959 | Seron | 224/205 X |
| 3,186,611 | 6/1965 | Sonderman | 224/205 |
| 4,055,873 | 11/1977 | Kallman | 224/901 X |
| 4,386,723 | 6/1983 | Mule | 224/901 X |
| 4,475,676 | 10/1984 | Smith | 224/269 X |
| 4,811,876 | 3/1989 | Riggi | 224/901 X |
| 4,881,672 | 11/1989 | Gustafson | 224/901 X |
| 4,883,171 | 11/1989 | Carlton | 206/315.11 |
| 4,953,770 | 9/1990 | Bond, Sr. | 224/901 X |

FOREIGN PATENT DOCUMENTS 104279  3/1917  United Kingdom ............... 224/194

Primary Examiner—Henry J. Recla
Assistant Examiner—Glenn T. Barrett
Attorney, Agent, or Firm—John M. Harrison

[57] ABSTRACT

A game call holder for mounting on the chest near the shoulder or shoulder and upper arm of a user and positioning a game call in close proximity to the mouth of the user, in order to leave the hands free. In a preferred embodiment the game call holder is characterized by a support member fitted with pile fasteners and a clip for attachment to the collar of the user's shirt, jacket or coat. One or more holder straps having one end attached to the support member and the opposite end fitted with one or more loop fasteners, movably and adjustably secure the game call to the support member. A flexible arm strap is also attached to the support member and extends around the arm of the user and includes a loop fastener strip for removable attachment to the support member to stabilize the support member on the user's chest or shoulder. The game call holder is designed to be ambidextrous, since it functions equally well on the chest or shoulder for right or left-handed individuals.

9 Claims, 2 Drawing Sheets

GAME CALL HOLDER

BACKGROUND OF THE INVENTION

1. Field of the Invention

This invention relates to game call holders and more particularly, to a game call holder which is designed for mounting an air-operated game call on the chest or shoulder of a user to position the game call with the mouthpiece in close proximity to the user's mouth, in order to leave the hands free. In a preferred embodiment the game call holder is characterized by a flat, flexible support member fitted with pile fasteners on the outside surface and a clip at one end for clipping to the collar of the shirt, coat or jacket of a user. One end of a pair of holder straps are attached to or extend from the support member and the opposite ends of the holder straps are fitted with loop fasteners for engaging the pile fasteners on the support member and securing a blow-type, air-operated game call such as a duck, goose, deer or predator call, in non-exclusive particular, to the support member in adjustable, removable relationship. A flexible arm strap is also attached to the support member and extends around the user or hunter's arm, where it is removably fitted to the pile fasteners on the support member by means of a loop fastener strip, in order to further stabilize the support member and the game call in a selected position on the user's chest or shoulder.

2. Description of the Prior Art

Game calls of various description have long been used by bird watchers, hunters and others to meet their game-attracting objectives in the field. Many of these game calls are air-operated by mouth and great skill can be achieved in attracting a wide diversity of game with practice in using such game calls, which include duck, goose, deer and predator calls, in non-exclusive particular. The air-operated, or blow-type game call is typically held to the mouth by one hand and operated by blowing air through the call, while the other hand readies binoculars or a rifle, bow or other equipment, in anticipation of approaching game. One of the problems which is inherent in the use of such game calls is the requirement of using at least one hand to operate the calls, thereby making it difficult to simultaneously steady binoculars or aim a shotgun, rifle or bow at approaching game which are attracted by the calls. These game calls are typically suspended from a lanyard or strap fitted around the hunter's neck or attached by means of a cord to an article of clothing such as a shirt, hunting coat or vest, to facilitate quick access when the calls are to be raised to the user's mouth. However, regardless of the lanyard or string-type mounting configuration, all game calls of this mouth-operated design must still be raised to the mouth with one hand and operated while holding the call to the mouth.

It is an object of this invention to provide a game call holder which is designed to receive and mount a blow-type game call in close proximity to the user's mouth and facilitate operation of the game call without the use of the hands.

Another object of the invention is to provide a universal game call holder which may be strapped to the chest area or either shoulder, in order to removably and adjustably locate a mouth-operated game call in close proximity to the user's mouth for operation without the use of the hands.

A still further object of this invention is to provide a portable, light-weight, easily used game call holder which can be mounted on the chest or shoulder of a hunter or other user and used to removably support a blow-type game call in adjustable relationship, to facilitate operation of the game call by the user while leaving the hands free for using binoculars, operating a rifle, shotgun or bow or for other purposes.

Still another object of this invention is to provide a new and improved game call holder for hunters, bird watchers and other users, which game call holder is characterized by a support member provided with one element of a loop-pile fastener, a clip attached to one end of the support member for attachment to an article of clothing such as the collar of a shirt, hunting jacket or coat and a strap for extending around the user's arm and shoulder for stabilizing the game call holder on the user's chest near the shoulder or at the shoulder and upper arm. At least one holder strap is attached to or extends from the support member and is fitted with a second element of the loop-pile fastener and engages a mouth-operated game call, to removably and adjustably mount the game call on the support member with the mouthpiece in close proximity to the hunter's mouth for operating the game call without requiring use of the hands.

Yet another object of the invention is to provide a portable, easily deployed game call holder for removably receiving a mouth-operated game call, which game call holder includes a flat support panel fitted with a first fastener element, a clip attached to one end of the support panel for removably securing the panel to the collar or other item of clothing worn by the user, one or more holder straps extending from the support panel and fitted with a second fastening element which is designed to engage the first fastener element on the support panel and removably locate the game call holder on the support panel and a flexible arm strap extending around an arm and over the shoulder of the user for stabilizing the support panel on the user's chest or shoulder.

SUMMARY OF THE INVENTION

These and other objects of the invention are provided in a game call holder which is small, portable, light in weight and easy to mount on the chest area near either shoulder, or on the shoulder and upper arm of a hunter or other user in ambidextrous fashion. In a preferred embodiment, the game call holder includes an elongated, flat support member fitted with multiple pile elements of a loop-pile fastener and a clip for attachment to the collar of a shirt, hunting coat or jacket. An arm strap is secured to the support member for extending around the arm of the user and a loop fastener strip is attached to the strap for removably securing the opposite end of the strap to the support member and stabilizing the game call holder on the user's chest or shoulder. A pair of spaced holder straps have one end attached to or extending from the support member and the opposite ends extend around the air-operated, blow-type game call. These ends are fitted with loop fasteners for removable attachment to the support member and situating the game call in adjustable, removable fashion on the support member, such that the mouthpiece of the game call is located in close proximity to the user's mouth to facilitate operation of the game call without the use of the hands.

BRIEF DESCRIPTION OF THE DRAWING

The invention will be better understood by reference to the accompanying drawing wherein.

DESCRIPTION OF THE PREFERRED EMBODIMENTS

Figure 1:
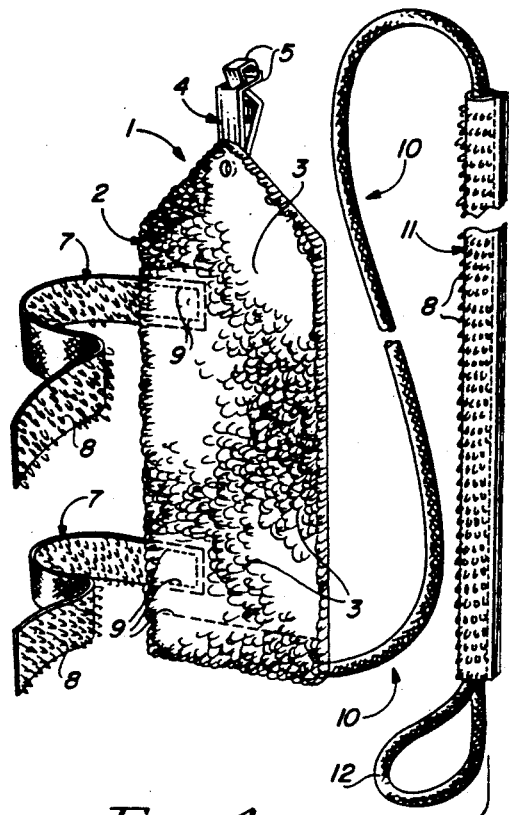
FIG. 1 is a perspective view of a preferred embodiment of the game call holder of this invention.

Referring initially to FIGS. 1-3 and 5 of the drawing, the game call holder of this invention is generally illustrated by reference numeral 1. In a preferred embodiment the game call holder 1 is characterized by a flat support member 2, which is constructed of a flexible material such as cloth or the like, with a sheet of nylon pile fastener 3 secured to the top surface of the support member 2, as illustrated. Alternatively, the flexible sheet of nylon pile fastener 3 alone may serve as the support member 2. A clip 4, such as an alligator clip or the like, having spring-operated engaging clip jaws 5, is secured to one end of the support member 2 for removable attachment to an article of clothing such as the collar 17 of a shirt, hunting coat or jacket 16 in alternative positions, as further illustrated in FIGS. 2 and 5. One end of a flexible arm strap 10 is attached to the support member 2 at the opposite end from the clip 4 and extends around the user's arm at the sleeve 18, back across the shoulder and terminates in an arm strap loop 12. A loop fastener strip 11 is sewn or otherwise secured to the opposite end of the arm strap 10 at the arm strap loop 12 and is fitted with loop fasteners 8, in order to removably secure the free end of the arm strap 10 to the support member 2 by engagement of the loop fasteners 8 and the companion pile fasteners 3. The arm strap 10 serves to further stabilize the support member 2 in proper position on the chest (FIG. 2) or shoulder and upper arm (FIG. 5) over or above the pocket 19, as further illustrated in FIGS. 2 and 5. One end of a pair of holder straps 7 are each attached to the support member 2 in spaced relationship by means of stitching 9 and the opposite ends are fitted with additional loop fasteners 8 for encircling a tubular, mouth-operated game call 14 and engaging the pile fasteners 3 with the support member 2, in order to secure the game call 14 in adjustable, removable relationship on the support member 2, as further illustrated in FIG. 2. The game call 14 is fitted with a mouthpiece 15 which extends toward the neck 13 and mouth 20 (FIG. 5) of the user and the position of the game call 14 can be adjusted with respect to the support member 2, such that the mouthpiece 15 is in a desired close proximity to the mouth 20 of the user and can be air-operated without using the hands.

Figure 4:
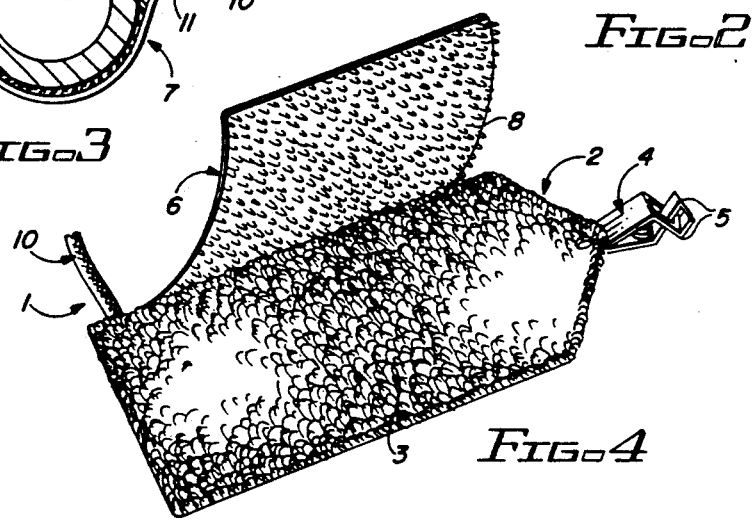
FIG. 4 is a perspective view of an alternative preferred embodiment of the game call holder of this invention.

Referring now to FIG. 4 of the drawing, in an alternative preferred embodiment of the invention a single holder member 6 is attached to or extends from the support member 2 and is fitted with loop fasteners 8 for engaging the game call 14 and securing the loop fasteners 8 with the corresponding pile fasteners 3 on the support member 2.

Figure 2:
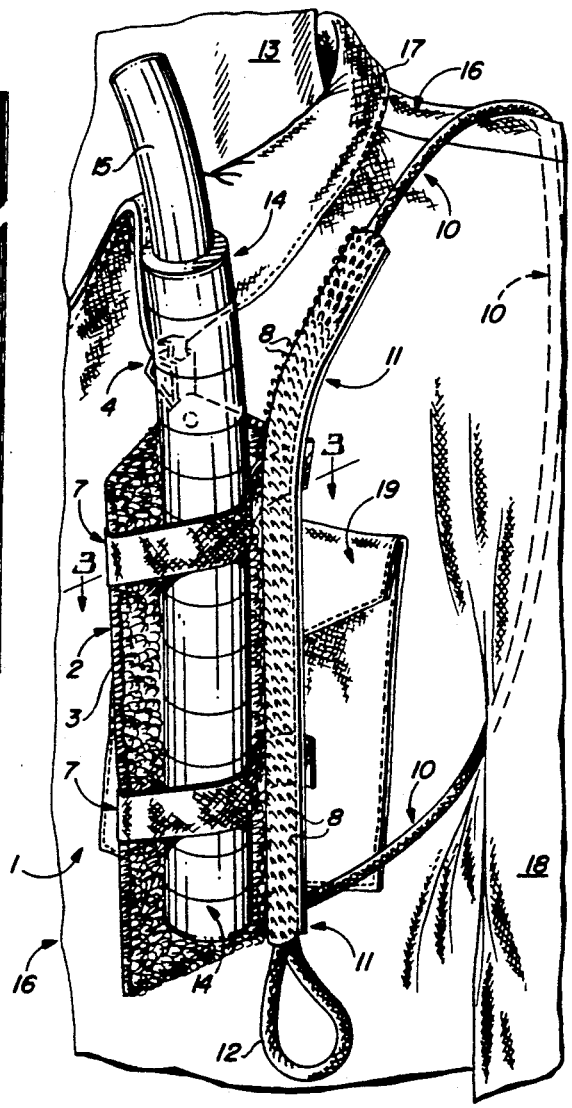
FIG. 2 is a perspective view of the game call holder illustrated in FIG. 1, mounted in a first preferred functional configuration on the left-hand chest area of a user.
Figure 3:
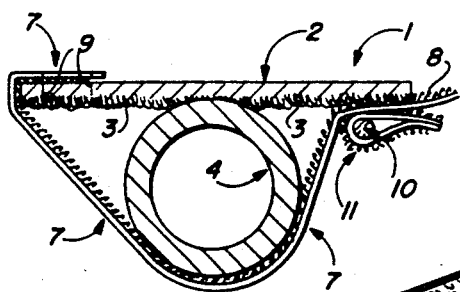
FIG. 3 is a sectional view, taken along line 3—3, of the game call holder illustrated in FIG. 2.
Figure 5:
FIG. 5 is a perspective view of the game call holder mounted in a second preferred configuration on the shoulder and upper arm of a user.

In use, and referring again to FIGS. 2 and 5, the game call holder 1 is positioned on the chest area near either shoulder or on either shoulder and upper arm in ambidextrous manner to accommodate a right or left-handed individual, as follows. As illustrated in FIG. 2, the support member 2 is initially placed in a typical position of use on the user's left chest area near the shoulder over the pocket 19 and the clip 4 is manipulated to engage the clip jaws 5 with the collar 17 on the shirt, hunting coat or jacket 16, worn by the user. The arm strap 10 is then looped around the arm and over the shoulder of the user and tightened and the loop fastener strip 11, attached to the free end of the arm strap 10, is allowed to rest alongside the support member 2 over the pocket 19. The free ends of the spaced holder straps 7 are then extended from the support member 2 and the game call 14 is placed in a desired position on the support member 2 against the pile fasteners 3. The holder straps 7 are looped around the game call 14, with the free ends pressed against the support member 2 in spaced relationship, to removably secure the game call 14 to the support member 2, as the respective loop fasteners 8, located on the holder straps 7, engage the corresponding pile fasteners 3 on the support member 2. The loop fastener strip 11 is then positioned on the support member 2 over the attached ends of the holder straps 7, with the loop fasteners 8 of the loop fastener strip 11 engaging the corresponding pile fastener 3, located on the support member 2. Accordingly, the clip 4 and arm strap 10 serve to securely locate the support member 2 in proper position on the chest of the user, while the holder straps 7 position the game call 14 on the support member 2, as further illustrated in FIG. 2. The mouthpiece 15 of the game call 14 extends upwardly in close proximity to the mouth 20 of the user and as so positioned, can be mouth-operated without using the hands. Accordingly, the mouthpiece 15 and game call 14 can be adjusted upwardly or downwardly, as well as from side-to-side, with respect to the support member 2 by manipulating the spaced holder straps 7, or in the case of the embodiment illustrated in FIG. 4, the holder member 6. Consequently, the game call 14 can be precisely positioned on either the right or left upper chest area as illustrated in FIG. 2, such that the mouthpiece 15 is in a desirable close proximity to the mouth 20 of the user and can be easily deployed in the mouth by turning the head and operated without the use of the hands. This leaves the hands free for using binoculars or firing a shotgun, rifle or bow, or for other desired purposes. For example, positioning of the game call 14 on the support member 2 of the game call holder 1 as described above facilitates reloading of a chosen weapon during hunting, while simultaneously attracting game by operation of the game call 14. Similarly, the game call holder 1 can be positioned on the user's shoulder and upper arm, as illustrated in FIG. 5, to locate the mouthpiece 15 in close proximity to the mouth 20 of the user, for the above described purpose.

It will be appreciated by those skilled in the art that the game call holder of this invention can be constructed of a variety of materials well known to those skilled in the art. Furthermore, the support member 2 and the holder straps 7 and holder member 6 may be constructed in any desired size, in order to accommodate a game call 14 of substantially any length and diameter. Moreover, while it is preferred to use matching loop-pile fastening elements such as the popular "Velcro" product on the support member 2, holder straps 7, holder member 6 and arm strap 10, it will be appreciated that alternative matching fasteners such as clips, buttons and snaps, in non-exclusive particular, may also be used, according to the knowledge of those skilled in the art. It is understood that the respective elements of the loop-pile fastener can be used interchangeably on the support member 2, holder straps 7, holder member 6 and arm strap 10, as desired. Other variations in the design of the game call holder 1 are also possible, including shaping a pocket (not illustrated) in the support member 2 for receiving the game call 14, which pocket may replace the spaced holder straps 7 and holder member 6.

Accordingly, while the preferred embodiments have been described above, it will be recognized and understood that various modifications may be made in the invention and the appended claims are intended to cover all such modifications which may fall within the spirit and scope of the invention.

Having described my invention with the particularity set forth above, what is claimed is:

1. A game call holder comprising support means adapted for positioning near the neck of a user; arm strap means carried by said support means for extending around an arm of the user and stabilizing said support means on the user's chest or shoulder; a clip carried by said support means for engaging an article of clothing worn by the user and locating said support means in a selected position near the neck of the user; and at least one holder strap carried by said support means for receiving a game call and selectively positioning the game call on said support means.

2. A game call holder for removably supporting an air-operated game call in close proximity to the mouth of a user, said game call holder comprising a substantially flat support member adapted for disposition on the user's chest or shoulder; a clip carried by said support member for removably engaging an article of clothing worn by the user and locating said support member in a selected position on the user's chest or shoulder; at least one holder strap carried by said support member and adapted for engaging the game call and said support member and removably securing the game call on said support member; and a flexible, elongated arm strap carried by said support member for extending around the arm and over the shoulder of the user and attached to said support member for stabilizing said support member on the user's chest or shoulder.

3. The game call holder of claim 2 wherein said at least one holder strap further comprises a pair of holder straps, each strap having a free end and one end attached to said support member in spaced relationship.

4. The game call holder of claim 3 further comprising a first element of a loop-pile fastener provided on said support member and a corresponding second element of said loop-pile fastener provided on the free ends of said holder straps, respectively, for removably engaging said first element and adjustably securing the game call on said support member.

5. The game call holder of claim 4 further comprising a second element of a loop-pile fastener provided on a free end of said arm strap for removably engaging said first element of said loop-pile fastener on said support member.

6. The game call holder of claim 3 further comprising a first element of a loop-pile fastener provided on said support member and a corresponding second element of said loop-pile fastener provided on said holder straps for removably engaging said first element and adjustably securing the game call on said support member and a second element of said loop-pile fastener provided on a free end of said arm strap for removably engaging said first element of said loop-pile fastener on said support member.

7. A game call holder for removably supporting an air-operated game call in close proximity to the mouth of a user, said game call holder comprising a substantially flat, flexible support member adapted for disposition on the user's chest or shoulder; a first element of a loop-pile fastener provided on said support member; a clip carried by one end of said support member for removably engaging the collar of an article of clothing worn by the user and locating said support member in a selected position on the user's chest or shoulder; a pair of holder straps carried by said support member in spaced relationship and adapted for removably engaging the game call, each of said straps having a free end; a second element of said loop-pile fastener provided on the free ends of said holder straps, respectively, for engaging said support member and removably securing the game call on said support member; and a flexible, elongated arm strap carried by said support member for extending around the arm and over the shoulder of the user and attached to said support member for stabilizing said support member on the user's chest or shoulder.

8. The game call holder of claim 7 further comprising a second element of a loop-pile fastener provided on a free end of said arm strap for removably engaging said first element of said loop-pile fastener on said support member.

9. The game call holder of claim 8 further comprising a loop provided in said free end of said arm strap.

* * * * *